US010796709B1

(12) United States Patent
Soerensen et al.

(10) Patent No.: US 10,796,709 B1
(45) Date of Patent: Oct. 6, 2020

(54) ACOUSTIC ECHO CANCELLATION BYPASS (71) Applicant: Microsoft Technology Licensing, LLC, Redmond, WA (US)

(72) Inventors: Karsten Vandborg Soerensen, Aalborg (DK); Warren Michael Lam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/414,704

(22) Filed: May 16, 2019

(51) Int. Cl.
*G10L 21/0232* (2013.01)
*G10L 21/0208* (2013.01)

(52) U.S. Cl.
CPC .............. *G10L 21/0232* (2013.01); *G10L 2021/02082* (2013.01)

(58) Field of Classification Search
None
See application file for complete search history.

(56) References Cited

U.S. PATENT DOCUMENTS

| | | | |
|---|---|---|---|
| 5,687,229 | A | 11/1997 | Sih |
| 8,098,813 | B2 | 1/2012 | Sorensen et al. |
| 8,295,475 | B2 | 10/2012 | Li et al. |
| 8,369,251 | B2 | 2/2013 | Prakash et al. |
| 8,503,669 | B2 | 8/2013 | Mao |
| 9,552,827 | B2 | 1/2017 | Johnston et al. |
| 9,591,123 | B2 | 3/2017 | Sorensen et al. |
| 9,653,092 | B2 | 5/2017 | Sun et al. |
| 2012/0219146 | A1* | 8/2012 | Mason .................. H04M 9/082 379/406.01 |
| 2013/0002797 | A1* | 1/2013 | Thapa .................. H04M 3/002 348/14.01 |
| 2015/0189092 | A1 | 7/2015 | Thapa et al. |
| 2018/0063008 | A1 | 3/2018 | Hammarqvist |

FOREIGN PATENT DOCUMENTS

EP 2493167 A1 8/2012

OTHER PUBLICATIONS

"Configuring Echo Cancellation", Voice Port Configuration Guide, Cisco IOS Release 15M&T, Nov. 17, 2017, pp. 1-22.
"US Non Provisional Application Filed under U.S. Appl. No. 15/885,518", filed Jan. 31, 2018, 40 Pages.
"International/Search Report and Written Opinion Issued in PCT Application No. PCT/US20/028033", dated Jul. 23, 2020, 10 Pages.

* cited by examiner

*Primary Examiner* — James K Mooney
(74) *Attorney, Agent, or Firm* — Alleman Hall Creasman & Tuttle LLP (57) ABSTRACT

A computing device is provided that may include a sound processing device configured to output sound output frames via a sound output device and capture sound input frames via a sound input device. The computing device further includes a processor configured to render a stream of sound output frames based on at least sound output data received from a remote computing device over a computer network, provide reference frames for each of the sound output frames to a reference frame buffer of an acoustic echo cancellation module. The processor may be further configured to detect a sound output frame rendering stall condition, and based on detecting the sound output frame rendering stall condition, suppress the acoustic echo cancellation module and send the stream of sound input frames to the remote computing device without being processed by the acoustic echo cancellation module.

20 Claims, 5 Drawing Sheets

ACOUSTIC ECHO CANCELLATION BYPASS

BACKGROUND

Voice over Internet Protocol (VoIP) software may use acoustic echo cancellation techniques to reduce the echo that may occur from sound output being played out of a speaker being captured by a microphone used to capture a user's speech input. However, stalls in a sound output rendering process of the VoIP software may potentially cause these echo cancellation techniques to internally buffer input frames, potentially causing a jitter spike when the buffered frames are sent to a remote computing device.

SUMMARY

A computing device is provided that may comprise a sound processing device configured to output sound output frames via a sound output device and capture sound input frames via a sound input device. The computing device may further comprise a processor configured to render a stream of sound output frames based on at least sound output data received from a remote computing device over a computer network, provide reference frames for each of the sound output frames to a reference frame buffer of an acoustic echo cancellation module, provide the stream of sound output frames to the sound processing device for output via the sound output device, and receive a stream of sound input frames from the sound processing device. The processor may be further configured to process the stream of sound input frames via the acoustic echo cancellation module by performing acoustic echo cancellation on each sound input frame using a corresponding reference frame from the reference frame buffer selected based on an estimated echo path delay. The processor may be further configured to send the processed stream of sound input frames to the remote computing device over the computer network, detect a sound output frame rendering stall condition, and based on detecting the sound output frame rendering stall condition, suppress the acoustic echo cancellation module and send the stream of sound input frames to the remote computing device without being processed by the acoustic echo cancellation module.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Acoustic echo cancellation techniques may be used to cancel or subdue acoustic echoes caused by a microphone picking up the sound output from a speaker. These techniques typically temporarily store a reference signal of the sound output, and use that reference signal to cancel out corresponding acoustic echoes that may have been picked up in the input signal of the microphone. However, typical acoustic echo cancellation implementations may cause delays in the sound samples sent to a remote computing device when glitches or stalls occur on the local computing device.

When a computer stalls, it may potentially create a stall in the playout audio such that sound output samples are not provided in time to the playout buffer of a sound card for output via the speakers. For example, a processor overload may potentially cause the processing threads handling the audio rendering of the output samples to be stalled until the processor is no longer overloaded. As another example, other threads may have locked processor resources for a longer period of time than estimated, which may cause the thread handling the audio rendering of the output samples to become stalled until processor resources are available.

However, during the period of time of the stall, an input capture side of the sound card can still be processing multiple input frames without any updates to the reference signal. As the stall on the audio rendering side exceeds a delay of the echo path, the reference signal that had been provided for acoustic echo cancellation may become out of date and/or desynced from the input side, potentially causing fading or other types of acoustic echo cancellation failures. Typically, when such a stall occurs, acoustic echo cancellation implementations may stop outputting output samples, and instead may internally buffer them until the stall is resolved and the reference signal to the acoustic echo canceller starts updating again. However, in these implementations, the pause caused by internally buffering the sound input may potentially cause a jitter spike when the buffered sound input is sent to a remote computing device. The jitter spike may potentially cause a jitter buffer of the remote computing device to drop data packets following the stall, and may also potentially cause an increase in a jitter buffer latency of the remote jitter buffer.

Figure 1:
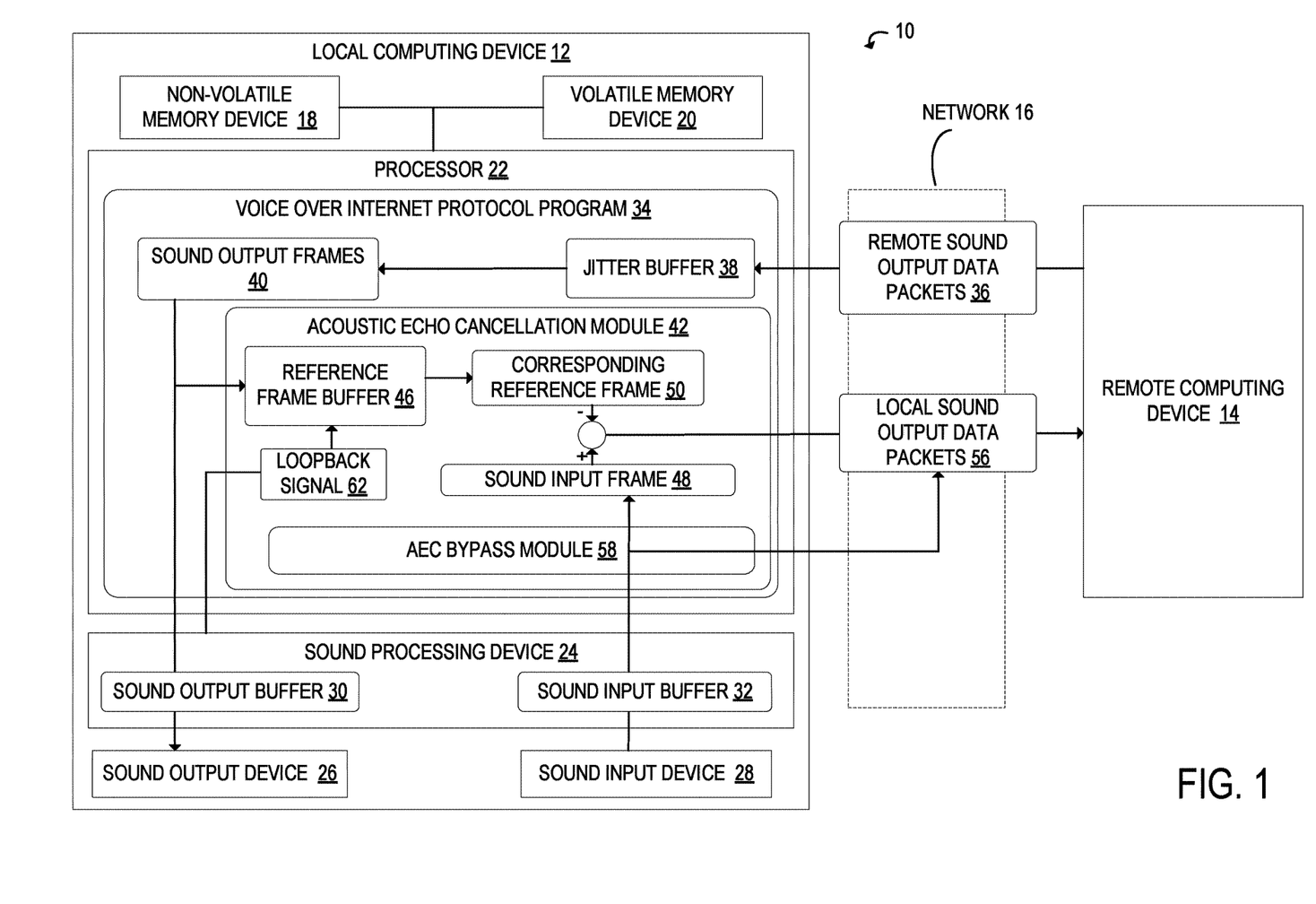
FIG. 1 shows a schematic view of an example computer system executing a Voice over Internet Protocol program that detects sound output rendering stall conditions and suppresses acoustic echo cancellation according to one embodiment of the present disclosure.

FIG. 1 illustrates a computer system 10 that includes a local computing device 12 that may be configured to communicate with one or more remote computing devices 14 over a computer network 16. The local computing device 12 and the one or more remote computing devices 14 may each include a non-volatile memory device 18, a volatile memory device 20, a processor 22, a sound processing device 24, a sound output device 26, a sound input device 28, and other suitable computer components. In one example, the local computing device 12 and the one or more remote computing devices 14 may take the form of desktop computing devices that includes a sound output device 26 in the form of a speaker device and a sound input device 28 in the form of a microphone device. However, it should be appreciated that the local computing device 12 and the one or more computing devices 14 may take other suitable forms, such as, for example, a laptop, a mobile computing device, a teleconferencing device, etc. In one example, the speaker device and microphone device may be included in a single device form factor such as a headset. In another example, speaker device and microphone device may be separate devices that are communicatively coupled to the local computing device 12.

The sound processing device 24 may take the form of a sound card that may, for example, be integrated with a motherboard or may be a separate card that is installed via a port of the motherboard. However, it should be appreciated that the sound processing device 24 may take other suitable forms. As illustrated in FIG. 1, the sound processing device 24 may be configured to output sound output frames via the sound output device 26, for example by converting those sound frames to an analog signal and sending that analog signal to the sound output device 26. The sound processing device 24 may also be configured to capture sound input frames via the sound input device 28 for example by converting analog input from the sound input device 28 to the digital domain and capturing sound frames at a series of timesteps in the digital domain.

In one example, the sound processing device 24 may include a sound output buffer 30 and a sound input buffer 32. The sound processing device 24 may be configured to receive and store sound output frames in the sound output buffer 30, and convert those sound output frames into an audio signal that may be played out from the sound output device 26. In one example, if the sound output buffer 30 is not provided with sound output frames from the processor 22, the sound processing device 24 may be configured to output a signal that contains "0" to the sound output device 26 such that sound is not output from the sound output device 26.

The sound processing device may be further configured to capture input signals via the sound input device 28, which, for example, may take the form of a microphone device as discussed above. The sound processing device 24 may convert the input signals into sound input frames that may be stored in the sound input buffer 32 for retrieval by the processor 22.

As illustrated in FIG. 1, the processor 22 of the local computing device 12 and the one or more remote computing devices 14 may be configured to execute a voice over internet protocol program (VoIP) 34 that mediate voice communications over the Internet Protocol computer network 16, which, for example, may take the form of a Wide Area Network such as the Internet. While the following discussion will describe the functions of the VoIP program 34 with reference to the local computing device 12, it should be appreciated that the described VoIP program 34 may also be implemented by each remote computing device 14.

The VoIP program 34 executed by the processor 22 of the local computing device 12 may be configured to receive remote sound output data packets 36 from the remote computing device 14 over the computer network 16. Typically, data packets received over the computer network 16 may be delayed, dropped, arrive out of order, etc., due to network congestion, network pathing, and other characteristics of the computer network 16. The processor 22 may be configured to temporarily store the received remote sound output data packets 36 in a jitter buffer 38. The data packets received from the remote computing device may be held in the jitter buffer 38 for a period of time, and the processor 22 may be configured to manage the data packets in the jitter buffer 38. For example, the processor 22 may be configured to remove duplicate data packets, re-order the data packets if they arrive out-of-order, rectify data packets drops, dynamically manage delay/latency based on an estimated network congestion, etc.

In one example, the jitter buffer 38 may be adaptive and may be controlled to balance latency and fidelity. For example, to reduce latency between a point in time that the remote sound output packets are received and a point in time that sound output frames may be rendered based on those data packets, the processor 22 may be configured to control the jitter buffer 38 to reduce a total delay that the packets are held in the jitter buffer 38 before rendering corresponding frames. However, if network congestion is high, reducing the delay of the jitter buffer 38 may potentially cause errors due to packet loss, delayed packets, out-of-order packets, etc., to impact the fidelity of the rendered sound output. On the other hand, the processor 22 may be configured to control the jitter buffer 38 to increase the total delay that the packets are held in the jitter buffer 38 in order to provide more time to rectify problems that may occur due to transmission over the computer network 16, thus potentially increasing quality and fidelity. By increasing and decreasing the delay, the processor 22 may dynamically balance between latency and fidelity and adapt to changing network characteristics.

As illustrated in FIG. 1, the processor 22 may be configured to render a stream of sound output frames 40 based on at least sound output data 36 received from the remote computing device 14 over the computer network 16. In one example, the processor 22 may be configured to process the sound output data 36 received from the remote computing device 14 using an audio rendering pipeline to generate a digital signal that may be provided to the sound processing device 24 for playout from the sound output device 26. The rendering pipeline may be configured to render the sound output frames 40 based on local user audio settings set by a user of the local computing device 12 and a type of sound output device 26 that is coupled to the local computing device, such as, for example, headphones, speakers, earbuds, etc. During rendering by the audio rendering pipeline, a digital signal that will be sent to the sound card for playout from the sound output device 26 is generated.

The processor 22 may be further configured to frame the rendered digital signal for the sound output into sequential sound output frames 40, which each include a discrete duration of the rendered digital signal for the sound output. For example, each sound output frame 40 may include 5-20 milliseconds of the rendered digital signal for the sound output. However, it should be appreciated that other discrete durations may be used for framing the rendered digital signal into sequential sound output frames 40, such as, for example, 30 milliseconds, 50 milliseconds, etc. In some examples, the stream of sound output frames 40 may be further modified by the sound processing device 24 based on locally stored sound sources, such as, for example, music files, playback of a video file, and/or operating system sounds that may be mixed into the stream of sound output frames 40 and played out of the sound output device 26. Sound data in the remote sound output data packets 36 may be ordered and framed into a sequence of sound output frames 40. The processor 22 may be configured to provide a reference signal to an acoustic echo cancellation module 42. The reference signal may include reference frames 44 for each of the sound output frames 40 that are temporarily stored in a reference frame buffer 46 of the acoustic echo cancellation module 42. The reference frames 44 may be held and delayed in the reference frame buffer 46 to be used during echo cancellation on corresponding input frames.

As illustrated in FIG. 1, the processor 22 may be further configured to provide the stream of sound output frames 40 to the sound processing device 24 for output via the sound output device 26. Concurrently to the sound output frames 40 being played out of the sound output device 26, the sound processing device 24 may also be capturing sound input via the sound input device 28. Due to the potential proximity of the sound input device 28, such as a microphone device, to the sound output device 26, such as a speaker device, the output of the speaker device may be captured by the microphone device, and cause an acoustic echo in the captured input.

The captured sound input may be processed by the sound processing device 24 and converted into sound input frames 48 that may be temporarily stored in the sound input buffer 32 for retrieval by the processor 22. Similarly to the sound output frames 40, the processor 22 may be configured to frame the digital signal of the captured sound input into sequential sound input frames 48, which each include a discrete duration of the rendered digital signal for the sound input. The sound input frames 48 may be configured to include the same duration of digital signal as the sound output frames 40.

Figure 2:
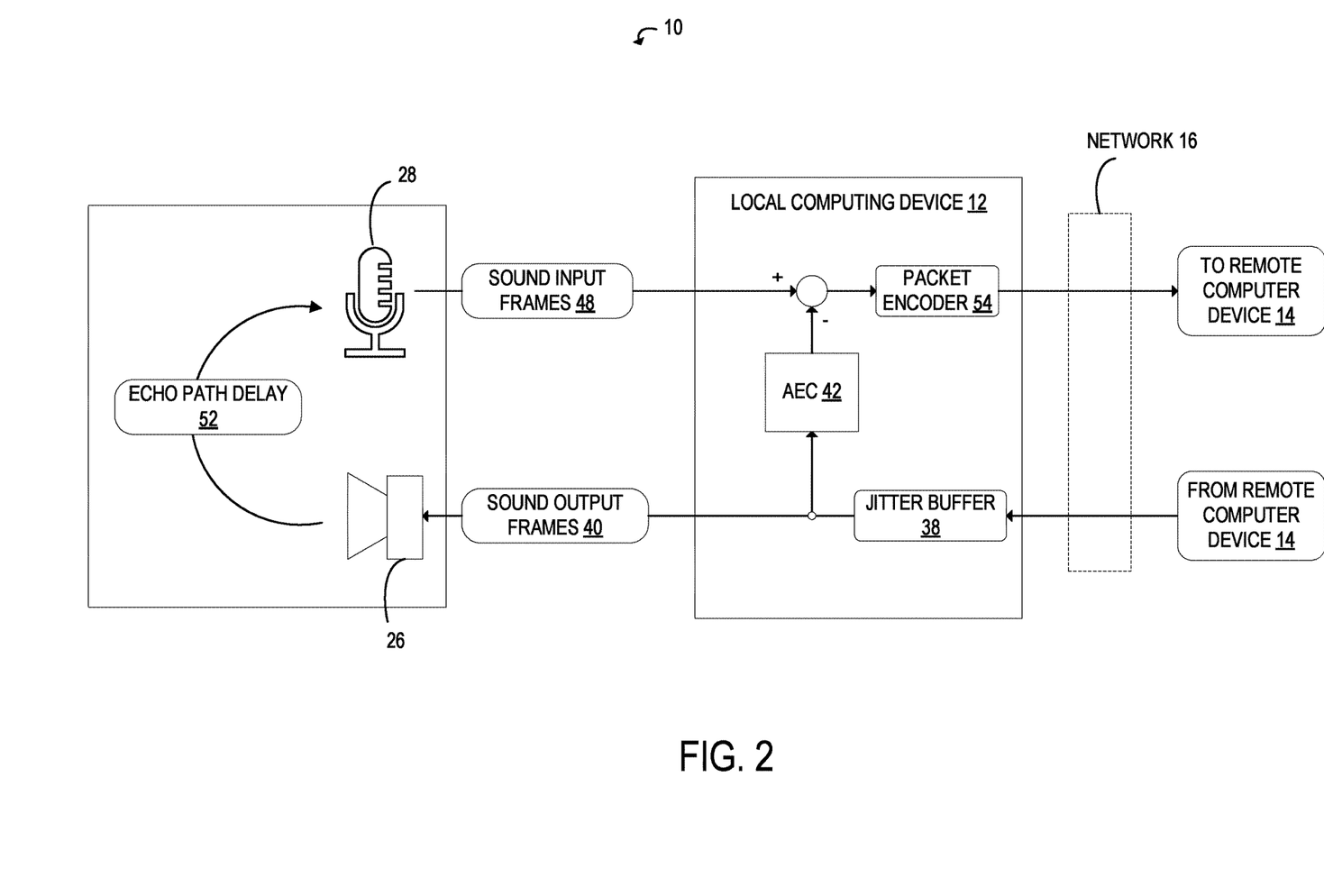
FIG. 2 shows a schematic view of the Voice over Internet Protocol program executed by the computer system of FIG. 1.

As illustrated in FIG. 1, the processor 22 may be configured to process the stream of sound input frames via the acoustic echo cancellation module 42. The acoustic echo cancellation (AEC) module 42 may be configured to perform acoustic echo cancellation on each sound input frame 48 using a corresponding reference frame 50 from the reference frame buffer 46 selected based on an estimated echo path delay 52. A total duration of the echo path delay 52 may be caused by output and input buffering, such as, for example, the sound output buffer 30 and the sound input buffer 32 of the sound processing device 24. However, it should be appreciated that other buffers may also contribute to the echo path delay 52. Additionally, a time it takes for sound output from the sound output device 26 to travel through the air and be captured by the sound input device 28 may also contribute to the total duration of the echo path delay 52. FIG. 2 illustrates an example travel portion of the echo path delay 52 that may be estimated by the processor 22. As shown, the sound output device 26 may be located proximate to the sound input device 28. Thus, sound output that is played from the sound output device 26 may travel through the air and may be captured by the sound input device 28. Traveling through the air over a distance between the sound output device 26 and the sound input device 28 will contribute to the echo path delay 52 between when a signal is played out and when that signal is captured. The length of the echo path delay 52 may be calculated by the processor 22, and may be used to select a suitable corresponding reference frame 50 for performing echo cancellation on a current sound input frame. Typically, the echo path delay 52 may have a duration of 30-300 milliseconds, with a larger proportion of that duration being caused by input and output buffering compared to a travel duration for the output from the sound output device 26 to be captured by the sound input device 28. However it should be appreciated that a total duration of the echo path delay 52 depends on a delay caused by input and output buffering and a distance between the sound output device and the sound input device.

As a specific example echo cancellation technique, the AEC module 42 may be configured to recognize that an echo of the signal of the corresponding reference frame 50 was captured in the current sound input frame 48, and subtract the signal of the corresponding reference frame 50 from a signal of that sound input frame 48. In one example, the AEC module 42 may be configured to inverse the signal of the corresponding reference frame 50 sum that inversed signal with the signal of the sound input frame 48, thus attenuating or cancelling out the acoustic echo.

Each sound input frame 48 in a stream of sound input frames may be processed by the AEC module 42. The processor 22 may be configured to send the processed stream of sound input frames to the remote computing device 14 over the computer network 16 as local sound output data packets 56. For example, the processor 22 may be configured to process the stream of sound input frames via a packet encoder 54 to generate the local sound output data packets 56 that may be transmitted to the remote computing device 14 over the computer network 16. The remote computing device 14 may receive the local sound output data packets 40, and may perform the same functions and processing described with reference to the local computing device 12.

As discussed above, the processing thread for the sound output rendering may potentially stall due to a processor overload, locks from other threads, etc. During the stall, an input capture side of the sound card can still be processing multiple input frames without any updates to the reference signal. Due to the echo path delay 52, there may still be corresponding reference frames for the sound input frames 48 for the duration of the echo path delay 52, and the AEC module 42 may continue performing echo cancellation on the stream of sound input frames 48. However, if the duration of the stall exceeds the duration of the echo path delay 52, and new reference signals are not provided to the AEC module 42, then the AEC module 42 may run out of usable reference frames for performing echo cancellation. As discussed above, typical AEC implementations will handle this stall by internally buffering the stream of sound input frames 48 until the reference signal is resumed. After the stall is resolved, these AEC implementations will apply the new reference signals to the internally buffered stream of sound input frames 48. However, sending the buffered sound input frames 48 will typically cause a jitter spike when received by the remote computing device 14. The jitter spike may potentially cause a jitter buffer of the remote computing device to drop data packets following the stall, and may also potentially cause an increase in a jitter buffer latency of the remote jitter buffer.

To address these issues, the processor 22 may be configured to execute an AEC bypass module 58. The AEC bypass module 58 may be configured to detect a sound output frame rendering stall condition, and suppress the AEC module 42. That is, rather than internally buffering the stream of sound input frames 48, the processor 22 may be configured to send the stream of sound input frames 48 to the remote computing device 14 without being processed by the AEC module 42. Due to the stall in the sound rendering thread, sound output frames 40 are not provided to the sound output buffer 30 of the sound processing device 24. As discussed above, when the sound processing device 24 does not receive sound output frames 40, the sound processing device 24 will play out a "0" signal (e.g. no sound). Thus, as the sound output device 26 is not playing out sound during the stall, the sound input device 28 will not capture any corresponding acoustic echoes. Accordingly, the AEC module 42 does not need to perform acoustic echo cancellation on those sound input frames 48, and the AEC bypass module 58 may be configured to send the stream of input frames 48 to the remote computing device 14 without performing echo cancellation.

During suppression of the AEC module 42, the processor 22 may be further configured to detect that the sound output frame rendering stall condition has been resolved. Thus, as the stall has been resolved, sound output frames 40 will be provided to the sound processing device 24 for playout from the sound output device 26, and a corresponding reference signal will be provided to the reference frame buffer 46 of the AEC module 42. After a duration of the echo path delay, the AEC module 42 will have reference frames that correspond to the current sound input frame 48, and the processor 22 may be configured to stop suppressing the AEC module 42. The stream of sound input frames 48 may then be processed by the AEC module 42 as discussed above before being sent to the remote computing device 14. In this manner, a stall on the sound rendering thread executed by the processor 22 of the local computing device 12 does not cause a delay/internal buffering of the stream of sound input frames, thus potentially preventing the jitter spike issues discussed above.

In one example, to detect the sound output frame rendering stall condition, the processor 22 may be configured to determine that new reference frames 44 have not been provided to the reference frame buffer 46 for more than a threshold period of time. In this example, the threshold period of time may be a duration of the estimated echo path delay 52. As discussed above, if the sound output rendering side has been stalled and the reference signal has not provided reference frames 44 to the AEC module 42 for a duration of the echo path delay 52, then the AEC module 42 may run out of reference frames 44 and cannot perform echo cancellation on the stream of input frames. Thus, upon detecting that the reference signal has not provided new reference frames for more than a duration of the echo path delay 52, the processor 22 may be configured to activate the AEC bypass module 58 to bypass the AEC module 42.

The processor 22 may be further configured to determine that new reference frames 44 have been provided to the reference frame buffer 46 of the AEC module 42, and detect that the sound output frame rendering stall has been resolved. After the duration of the echo path delay 52, the new reference frames will correspond to the current sound input frames, and the processor 22 may stop suppressing the AEC module 42.

Figure 3:
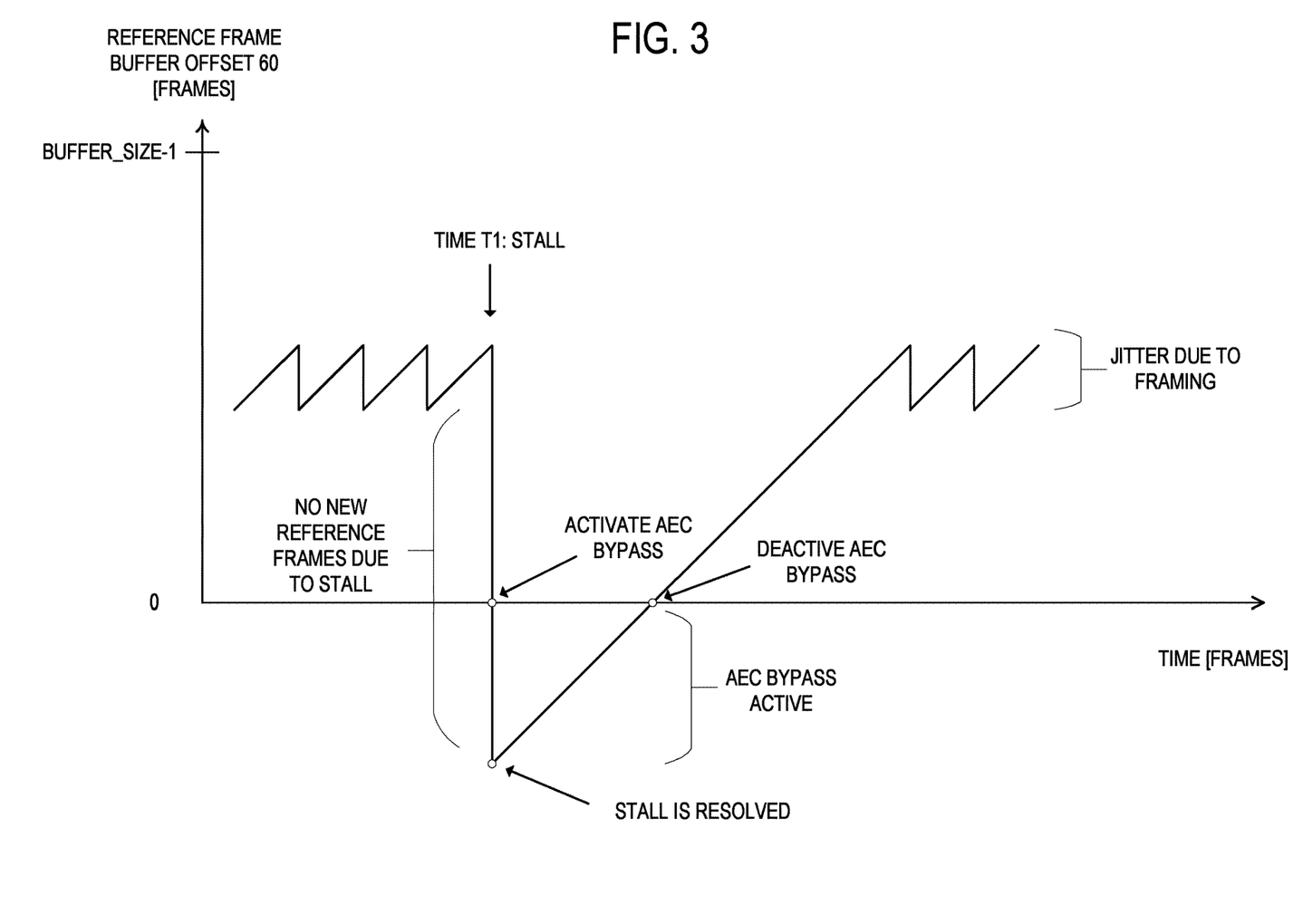
FIG. 3 shows a graph for incrementing and decrementing a reference frame buffer offset for the Voice over Internet Protocol program executed by the computer system of FIG. 1.

Turning to FIG. 3, in one example, the AEC module 42 may be configured to sync the stream of sound input frames 48 with corresponding reference frames 50 using a reference frame buffer offset 60. The reference frame buffer offset 60 may be set based on the estimated echo path delay 52 such that the reference frame buffer offset 60 points to a position in the reference frame buffer 46 that contains a corresponding reference frame 50 for the current sound input frame 48 being processed by the AEC module 42. FIG. 3 illustrates a graph having a Y-axis that represents index values of the reference frame buffer 46, which, for example, may take the form of an array data structure. However, it should be appreciated that other types of data structures may be used for the reference frame buffer 46. The X-axis represents time in units of frames, which, for example, may include 10-20 milliseconds of sound data. However, it should be appreciated that the frames may contain any suitable duration of sound data, such as, for example, 5 milliseconds.

The processor 22 may be configured to increment the reference frame buffer offset 60 for the reference frame buffer 46 when a new reference frame 44 is stored in the reference frame buffer 46. That is, each time a new reference frame 44 is provided to the AEC module 42 in the reference signal from the sound rendering thread, the reference frame buffer offset 60 and time may be incremented by one unit. In this manner, the reference frame buffer offset 60 will provide an offset for the estimated echo path delay 52, and the processor 22 may be configured to select a reference frame 44 indicated by the reference frame buffer offset 52 as the corresponding reference frame 50 for performing acoustic echo cancellation on a current sound input frame 48 in the stream.

After performing echo cancellation on the current input frame, the processor 22 may be configured to remove the selected corresponding reference frame 50 from the reference frame buffer 46, and decrement the reference frame buffer offset 60 for the reference frame buffer 46. That is, the reference frame buffer offset 60 is incremented when a new reference frame is added to the reference frame buffer, and decremented when a reference frame is removed from the buffer and used for echo cancellation of a current input frame. The reference frame buffer 46 may, in some examples, be implemented using a circular buffer. However, it should be appreciated that other suitable buffering techniques may also be used for the reference frame buffer 46.

As illustrated in FIG. 3, during a stall of the sound output rendering thread at time T1, new reference frames 44 are not provided to the AEC module 42. Thus, the reference frame buffer offset 60 and time is not incremented. However, as the sound input thread may be still processing, the remaining reference frames 44 in the reference frame buffer may continue to be removed and used for echo cancellation of the current sound input frame in the stream. Thus, the reference frame buffer offset 60 may continue to be decremented. If the stall continues for a duration longer than the echo path delay 52, then the reference frame buffer may run out of reference frames, and the reference frame buffer offset 60 may be decremented until it points outside of the reference frame buffer 46 (e.g., a negative value). In one example, the processor 22 may be configured to detect the sound output frame rendering stall condition by determining that a value of the reference frame buffer offset 60 is outside of the reference frame buffer 46, which may indicate that the reference frame buffer 46 does not contain any corresponding reference frame for the current sound input frame. Thus, as discussed above, the processor 22 may be configured to activate the AEC bypass module 58 and suppress the AEC module 42.

Once the stall of the sound output rendering thread has been resolved, sound output frames will start being provided to the sound processing device 24 for playout from the sound output device 26, and new reference frames 44 will be provided to the AEC module 42. Thus, the reference frame buffer offset 60 and time will be incremented with each new reference frame. In the example illustrated in FIG. 3, the processor 22 may be configured to detect that the sound output frame rendering stall condition has been resolved by determining that the value of the reference frame buffer offset 60 is inside of the reference frame buffer 46. That is, the processor 22 may be configured to deactivate the AEC bypass module 58 suppression of the AEC module 42 when the reference frame buffer 46 contains a reference frame that corresponds to the current sound input frame, as determined by the reference frame buffer offset 60.

Turning back to FIG. 1, in one example, the sound processing device 24 may be configured to modify the sound output frames 40 received from the processor 22. For example, the sound processing device 24 may be configured to add sound effects, increase/decrease sound volume and/or pitch, or otherwise modify the sound output frames 40. In this example, the sound processing device 24 may on some platforms be configured to provide a loopback signal 62 to the processor 22 that includes the modified sound output frames. That is, as the sound output frames 40 have been modified by the sound processing device 24, the original sound output frames 40 may no longer be useful as reference frames for echo cancellation. Thus, in this example, the modified sound output frames may be provided to the AEC module 42 via the loopback signal, and may be used as the reference frames 44 that are stored in the reference frame buffer 46 and used to perform echo cancellation.

However, in some cases, a stall may potentially occur in the loopback signal and not the sound output rendering thread. Thus, in this scenario, sound output frames would continue to be provided to the sound processing device 24 for playout from the sound output device 26, but reference frames 44 from the stalled loopback signal would not be provided to the AEC module 42. As the sound input device 28 would capture the sound output frames and thus contain an acoustic echo, the processor 22 may be configured to prevent suppression of the AEC module 42. To detect this scenario, the processor 22 may be configured to receive updates from both the sound output rendering thread and the loopback signal 62, and may be configured to determine that a stall occurred in the loopback signal 62 and that sound output frames 40 are being provided to the sound output buffer 30 of the sound processing device 24. Based on determining that the stall occurred in the loopback signal 62, the processor may be configured to prevent suppression of the acoustic echo cancellation module 42. In this example, the AEC module 42 may internally buffer the sound input frames 48 until the stall in the loopback signal 62 has been resolved, and new reference frames 44 are provided to the AEC module 42.

Figure 4:
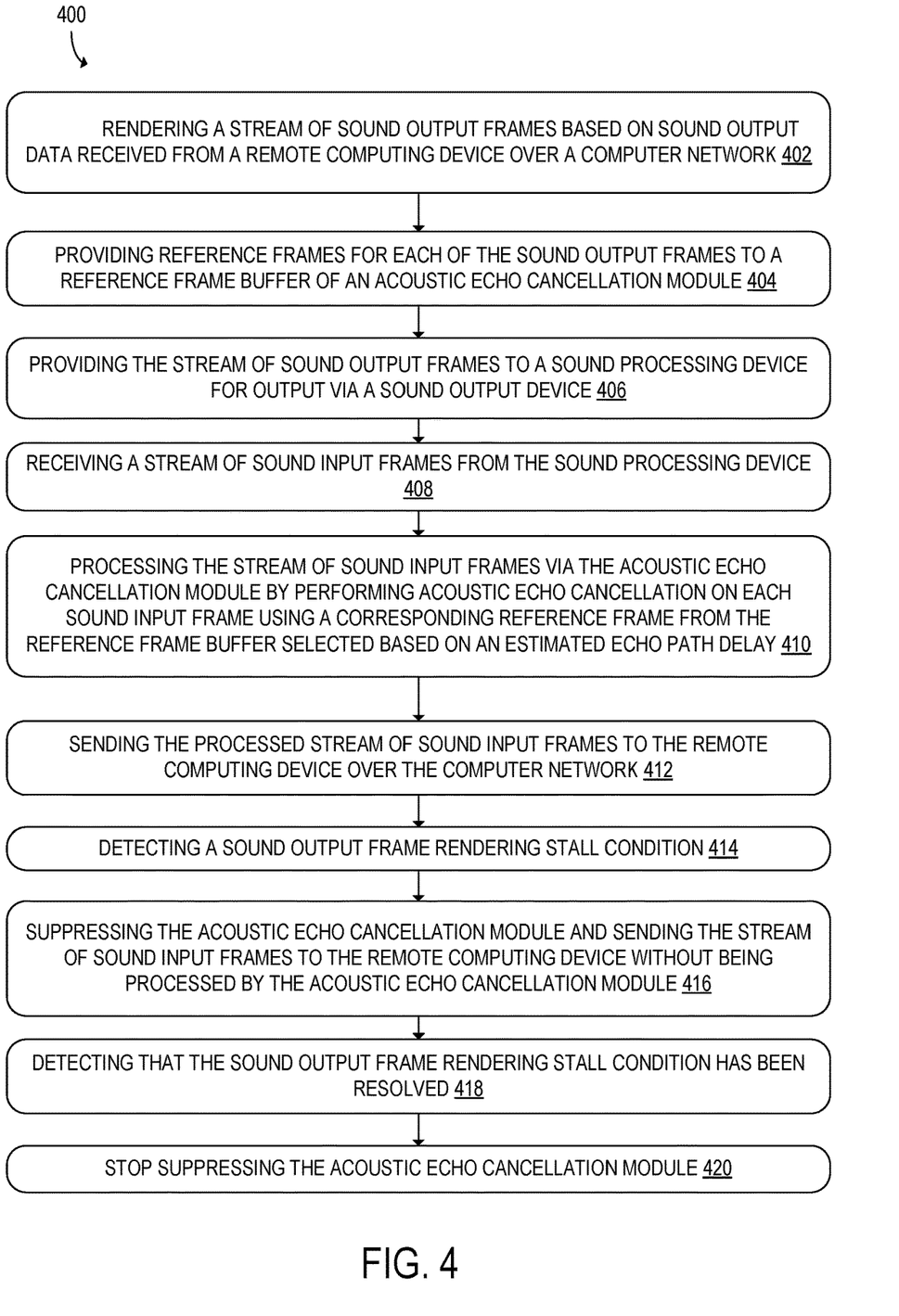
FIG. 4 shows an example method for detecting sound output rendering stall conditions and suppressing acoustic echo cancellation that may be implemented by the computer system of FIG. 1.

FIG. 4 illustrates a flow chart of a method 400 for suppressing acoustic echo cancellation when a stall condition is detected. The method 400 may be implemented by the local computing device 12 and one or more remote computing devices 14 illustrated in FIG. 1.

At 402, the method 400 may include rendering a stream of sound output frames based on at least sound output data received from a remote computing device over a computer network. The sound output data may be received from the remote computing device as network packets, and may be temporarily stored in a jitter buffer. Sound data contained in these network packets may be used to render the stream of sound output frames by a sound output rendering thread executed by a processor.

At 404, the method 400 may include providing reference frames for each of the sound output frames to a reference frame buffer of an acoustic echo cancellation module. The reference frames may be provided in a reference signal to the acoustic echo cancellation module. Each reference frame may be temporarily stored in the reference frame buffer and used for echo cancellation.

At 406, the method 400 may include providing the stream of sound output frames to a sound processing device for output via a sound output device. The sound processing device may be configured to convert the sound output frames into signals that may be played out of the sound output device. The sound output device, may, for example, take the form of a speaker.

At 408, the method 400 may include receiving a stream of sound input frames from the sound processing device. The sound input device, may, for example, take the form of a microphone that is located proximate to the speaker. Due to this proximity, the microphone may capture the sound being played out of the speaker, causing an acoustic echo to be included in the captured input frames. The sound processing device may convert the input signals captured by the microphone into sound input frames that are sent to the acoustic echo cancellation module.

At 410, the method 400 may include processing the stream of sound input frames via the acoustic echo cancellation module by performing acoustic echo cancellation on each sound input frame using a corresponding reference frame from the reference frame buffer selected based on an estimated echo path delay. The echo path delay may be a duration of time that it takes for sound to travel from the speaker to the microphone. The acoustic echo cancellation may be performed according to the techniques described above with reference to FIG. 1.

At 412, the method 400 may include sending the processed stream of sound input frames to the remote computing device over the computer network. The stream of sound input frames may be encoded into network packets according to the Internet Protocol of the computer network and sent to the remote computing device.

At 414, the method 400 may include detecting a sound output frame rendering stall condition. In one example, the stall condition may be detected by determining that new reference frames have not been provided to the reference frame buffer for more than a threshold period of time. Further in this example, the threshold period of time may be the estimated echo path delay. Other techniques for detecting the stall condition are described above with reference to FIG. 3.

At 416, the method 400 may include, based on detecting the sound output frame rendering stall condition, suppressing the acoustic echo cancellation module and sending the stream of sound input frames to the remote computing device without being processed by the acoustic echo cancellation module. The unprocessed sound input frames may be encoded into network packets and sent to the remote computing device.

At 418, the method 400 may include detecting that the sound output frame rendering stall condition has been resolved. In one example, detecting that the sound output frame rendering stall condition has been resolved may include determining that new reference frames have been provided to the reference frame buffer. Other techniques for determining that the stall condition has been resolved are described above with reference to FIG. 3.

At 420, the method 400 may include, based on detecting that the sound output frame rendering stall condition has been resolved, stopping suppression of the acoustic echo cancellation module. After stopping suppression of the acoustic echo cancellation module, the method may return to step 410 and continue performing acoustic echo cancellation on the stream of sound input frame.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
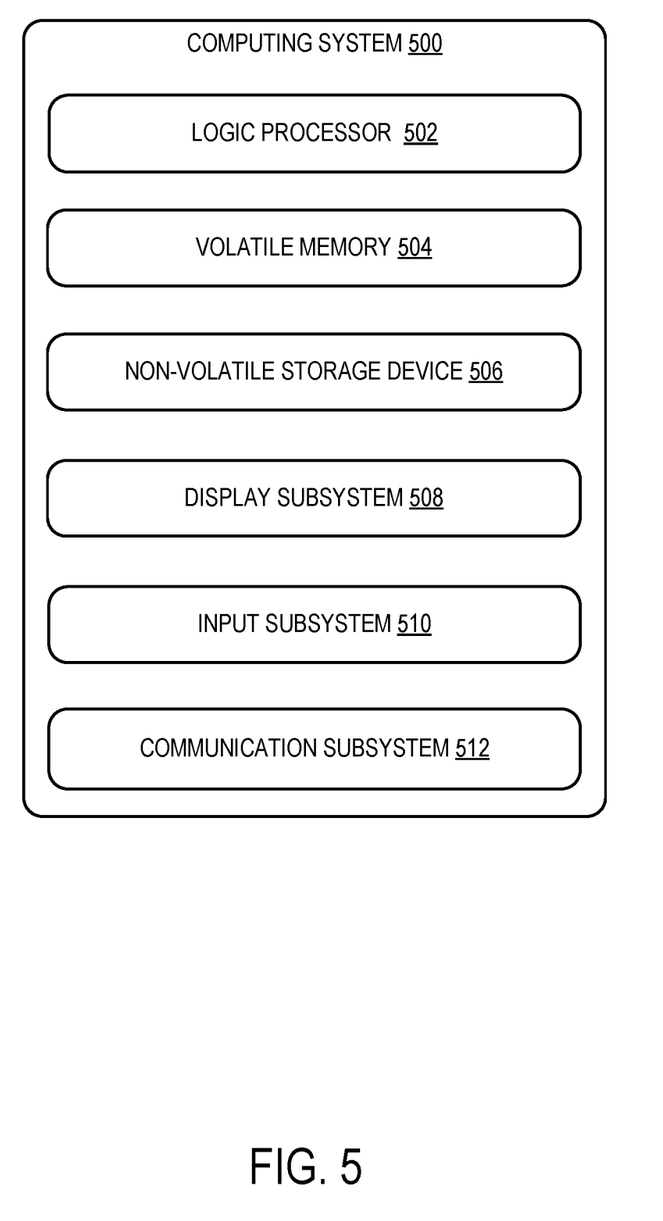
FIG. 5 shows a schematic view of an example computing environment in which the computing device of FIG. 1 may be enacted.

FIG. 5 schematically shows a non-limiting embodiment of a computing system 500 that can enact one or more of the methods and processes described above. Computing system 500 is shown in simplified form. Computing system 500 may embody the computing device 12 and one more remote computing devices 14 described above and illustrated in FIG. 1. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 5.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs provide additional support for the claims of the subject application. One aspect provides a computing device comprising a sound processing device configured to output sound output frames via a sound output device and capture sound input frames via a sound input device. The computing device further comprises a processor configured to render a stream of sound output frames based on at least sound output data received from a remote computing device over a computer network, provide reference frames for each of the sound output frames to a reference frame buffer of an acoustic echo cancellation module, provide the stream of sound output frames to the sound processing device for output via the sound output device, receive a stream of sound input frames from the sound processing device, and process the stream of sound input frames via the acoustic echo cancellation module by performing acoustic echo cancellation on each sound input frame using a corresponding reference frame from the reference frame buffer selected based on an estimated echo path delay. The processor is further configured to send the processed stream of sound input frames to the remote computing device over the computer network, detect a sound output frame rendering stall condition, and based on detecting the sound output frame rendering stall condition, suppress the acoustic echo cancellation module and send the stream of sound input frames to the remote computing device without being processed by the acoustic echo cancellation module. In this aspect, additionally or alternatively, the processor may be configured to detect that the sound output frame rendering stall condition has been resolved, and based on detecting that the sound output frame rendering stall condition has been resolved, stop suppressing the acoustic echo cancellation module. In this aspect, additionally or alternatively, to detect the sound output frame rendering stall condition, the processor may be configured to determine that new reference frames have not been provided to the reference frame buffer for more than a threshold period of time. In this aspect, additionally or alternatively, the threshold period of time may be the estimated echo path delay. In this aspect, additionally or alternatively, to detect that the sound output frame rendering stall condition has been resolved, the processor may be configured to determine that new reference frames have been provided to the reference frame buffer. In this aspect, additionally or alternatively, to determine the corresponding reference frame, the processor may be configured to set a reference frame buffer offset for the reference frame buffer based on the estimated echo path delay, increment the reference frame buffer offset for the reference frame buffer when a new reference frame is stored in the reference frame buffer, and select a reference frame indicated by the reference frame buffer offset as the corresponding reference frame for performing acoustic echo cancellation on a current sound input frame in the stream. In this aspect, additionally or alternatively, to perform acoustic echo cancellation on the current sound input frame, the processor may be further configured to remove the selected corresponding reference frame from the reference frame buffer, and decrement the reference frame buffer offset for the reference frame buffer. In this aspect, additionally or alternatively, to detect the sound output frame rendering stall condition, the processor may be configured to determine that a value of the reference frame buffer offset is outside of the reference frame buffer. In this aspect, additionally or alternatively, to detect that the sound output frame rendering stall condition has been resolved, the processor may be configured to determine that the value of the reference frame buffer offset is inside of the reference frame buffer. In this aspect, additionally or alternatively, the sound processing device may be configured to concurrently play sound output frames stored in an output buffer via the sound output device and capture sound input frames via the sound input device and store the captured sound input frames in an input buffer, and the processor may be configured to provide the stream of sound output frames to the output buffer for output from the sound output device, and retrieve the stream of sound input frames from the sound input buffer. In this aspect, additionally or alternatively, the sound processing device may be further configured to modify the sound output frames received from the processor, provide a loopback signal to the processor that includes the modified sound output frames, and the modified sound output frames of the loopback signal may be provided to the reference frame buffer of the acoustic echo cancellation module as the reference frames. In this aspect, additionally or alternatively, to detect the sound output frame rendering stall condition, the processor may be further configured to determine that a stall occurred in the loopback signal and that sound output frames are being provided to the sound output buffer, and based on determining that the stall occurred in the loopback signal, prevent suppression of the acoustic echo cancellation module.

Another aspect provides a method comprising, at a processor, rendering a stream of sound output frames based on at least sound output data received from a remote computing device over a computer network, providing reference frames for each of the sound output frames to a reference frame buffer of an acoustic echo cancellation module, providing the stream of sound output frames to a sound processing device for output via a sound output device, receiving a stream of sound input frames from the sound processing device, and processing the stream of sound input frames via the acoustic echo cancellation module by performing acoustic echo cancellation on each sound input frame using a corresponding reference frame from the reference frame buffer selected based on an estimated echo path delay. The method further comprises sending the processed stream of sound input frames to the remote computing device over the computer network, detecting a sound output frame rendering stall condition, and based on detecting the sound output frame rendering stall condition, suppressing the acoustic echo cancellation module and sending the stream of sound input frames to the remote computing device without being processed by the acoustic echo cancellation module. In this aspect, additionally or alternatively, the method may further comprise detecting that the sound output frame rendering stall condition has been resolved, and based on detecting that the sound output frame rendering stall condition has been resolved, stop suppressing the acoustic echo cancellation module. In this aspect, additionally or alternatively, detecting the sound output frame rendering stall condition may further comprise determining that new reference frames have not been provided to the reference frame buffer for more than a threshold period of time. In this aspect, additionally or alternatively, the threshold period of time may be the estimated echo path delay. In this aspect, additionally or alternatively, detecting that the sound output frame rendering stall condition has been resolved may further comprise determining that new reference frames have been provided to the reference frame buffer.

Another aspect provides a computing device comprising a processor configured to execute instructions for an acoustic echo cancellation module, the instructions being configured to cause the processor to receive reference frames for each of sound output frame in a stream of sound output frames, store each reference frame in a reference frame buffer, receive a stream of sound input frames, perform acoustic echo cancellation on each sound input frame using a corresponding reference frame from the reference frame buffer selected based on an estimated echo path delay, detect a sound output frame rendering stall condition, and based on detecting the sound output frame rendering stall condition, suppress performing acoustic echo cancellation on the stream of sound input frames. In this aspect, additionally or alternatively, the processor may be further configured to, based on detecting the sound output frame rendering stall condition, send the stream of sound input frames to a remote computing device without performing acoustic echo cancellation on the stream of sound input frames. In this aspect, additionally or alternatively, the processor may be configured to detect that the sound output frame rendering stall condition has been resolved, and based on detecting that the sound output frame rendering stall condition has been resolved, stop suppressing performing the acoustic echo cancellation on the stream of sound input frames.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a sound processing device configured to output sound output frames via a sound output device and capture sound input frames via a sound input device;
a processor configured to:
render a stream of sound output frames based on at least sound output data received from a remote computing device over a computer network;
provide reference frames for each of the sound output frames to a reference frame buffer of an acoustic echo cancellation module;
provide the stream of sound output frames to the sound processing device for output via the sound output device;
receive a stream of sound input frames from the sound processing device;
process the stream of sound input frames via the acoustic echo cancellation module by performing acoustic echo cancellation on each sound input frame using a corresponding reference frame from the reference frame buffer selected based on an estimated echo path delay;
send the processed stream of sound input frames to the remote computing device over the computer network;
detect a stall in a sound rendering process performed by the computing device that provides reference frames for rendered sound output frames to the reference frame buffer; and
responsive to detecting the stall in the sound rendering process, suppress the acoustic echo cancellation module and send the stream of sound input frames to the remote computing device without being processed by the acoustic echo cancellation module.

2. The computing device of claim 1, wherein the processor is configured to:
detect that the stall in the sound rendering process has been resolved; and
based on detecting that the stall in the sound rendering process has been resolved, stop suppressing the acoustic echo cancellation module.

3. The computing device of claim 2, wherein to detect the stall in the sound rendering process, the processor is configured to determine that new reference frames have not been provided to the reference frame buffer for more than a threshold period of time.

4. The computing device of claim 3, wherein the threshold period of time is the estimated echo path delay.

5. The computing device of claim 3, wherein to detect that the stall in the sound rendering process has been resolved, the processor is configured to determine that new reference frames have been provided to the reference frame buffer.

6. The computing device of claim 2, wherein to determine the corresponding reference frame, the processor is configured to:
set a reference frame buffer offset for the reference frame buffer based on the estimated echo path delay;
increment the reference frame buffer offset for the reference frame buffer when a new reference frame is stored in the reference frame buffer; and
select a reference frame indicated by the reference frame buffer offset as the corresponding reference frame for performing acoustic echo cancellation on a current sound input frame in the stream.

7. The computing device of claim 6, wherein to perform acoustic echo cancellation on the current sound input frame, the processor is further configured to:
remove the selected corresponding reference frame from the reference frame buffer; and
decrement the reference frame buffer offset for the reference frame buffer.

8. The computing device of claim 7, wherein to detect the stall in the sound rendering process, the processor is configured to determine that a value of the reference frame buffer offset is outside of the reference frame buffer.

9. The computing device of claim 8, wherein to detect that the stall in the sound rendering process has been resolved, the processor is configured to determine that the value of the reference frame buffer offset is inside of the reference frame buffer.

10. The computing device of claim 1, wherein the sound processing device is configured to concurrently play sound output frames stored in an output buffer via the sound output device and capture sound input frames via the sound input device and store the captured sound input frames in an input buffer;
wherein the processor is configured to provide the stream of sound output frames to the output buffer for output from the sound output device, and retrieve the stream of sound input frames from the sound input buffer.

11. The computing device of claim 10, wherein the sound processing device is further configured to:
modify the sound output frames received from the processor;
provide a loopback signal to the processor that includes the modified sound output frames; and wherein the modified sound output frames of the loopback signal are provided to the reference frame buffer of the acoustic echo cancellation module as the reference frames.

12. The computing device of claim 11, wherein to detect the stall in the sound rendering process, the processor is further configured to:
determine that a stall occurred in the loopback signal and that sound output frames are being provided to the sound output buffer; and
based on determining that the stall occurred in the loopback signal, prevent suppression of the acoustic echo cancellation module.

13. A method comprising:
at a computing device including a processor:
rendering a stream of sound output frames based on at least sound output data received from a remote computing device over a computer network;
providing reference frames for each of the sound output frames to a reference frame buffer of an acoustic echo cancellation module;
providing the stream of sound output frames to a sound processing device for output via a sound output device;
receiving a stream of sound input frames from the sound processing device;
processing the stream of sound input frames via the acoustic echo cancellation module by performing acoustic echo cancellation on each sound input frame using a corresponding reference frame from the reference frame buffer selected based on an estimated echo path delay;
sending the processed stream of sound input frames to the remote computing device over the computer network;
detecting a stall in a sound rendering process performed by the computing device that provides reference frames for rendered sound output frames to the reference frame buffer; and
responsive to detecting the stall in the sound rendering process, suppressing the acoustic echo cancellation module and sending the stream of sound input frames to the remote computing device without being processed by the acoustic echo cancellation module.

14. The method of claim 13, further comprising:
detecting that the stall in the sound rendering process has been resolved; and
based on detecting that the stall in the sound rendering process has been resolved, stop suppressing the acoustic echo cancellation module.

15. The method of claim 14, wherein detecting the stall in the sound rendering process further comprises determining that new reference frames have not been provided to the reference frame buffer for more than a threshold period of time.

16. The method of claim 15, wherein the threshold period of time is the estimated echo path delay.

17. The method of claim 16, wherein detecting that the stall in the sound rendering process has been resolved further comprises determining that new reference frames have been provided to the reference frame buffer.

18. A computing device comprising:
a processor configured to execute instructions for an acoustic echo cancellation module, the instructions being configured to cause the processor to:
receive reference frames for each sound output frame in a stream of sound output frames;
store each reference frame in a reference frame buffer;
receive a stream of sound input frames;
perform acoustic echo cancellation on each sound input frame using a corresponding reference frame from the reference frame buffer selected based on an estimated echo path delay;
detect a stall in a sound rendering process performed by the computing device that provides the received reference frames that are stored in the reference frame buffer; and
responsive to detecting the stall in the sound rendering process, suppress performing acoustic echo cancellation on the stream of sound input frames.

19. The computing device of claim 18, wherein the processor is further configured to, based on detecting the stall in the sound rendering process, send the stream of sound input frames to a remote computing device without performing acoustic echo cancellation on the stream of sound input frames.

20. The computing device of claim 19, wherein the processor is configured to:
detect that the stall in the sound rendering process has been resolved; and
based on detecting that the stall in the sound rendering process has been resolved, stop suppressing performing the acoustic echo cancellation on the stream of sound input frames.

* * * * *